Patented Nov. 4, 1924.

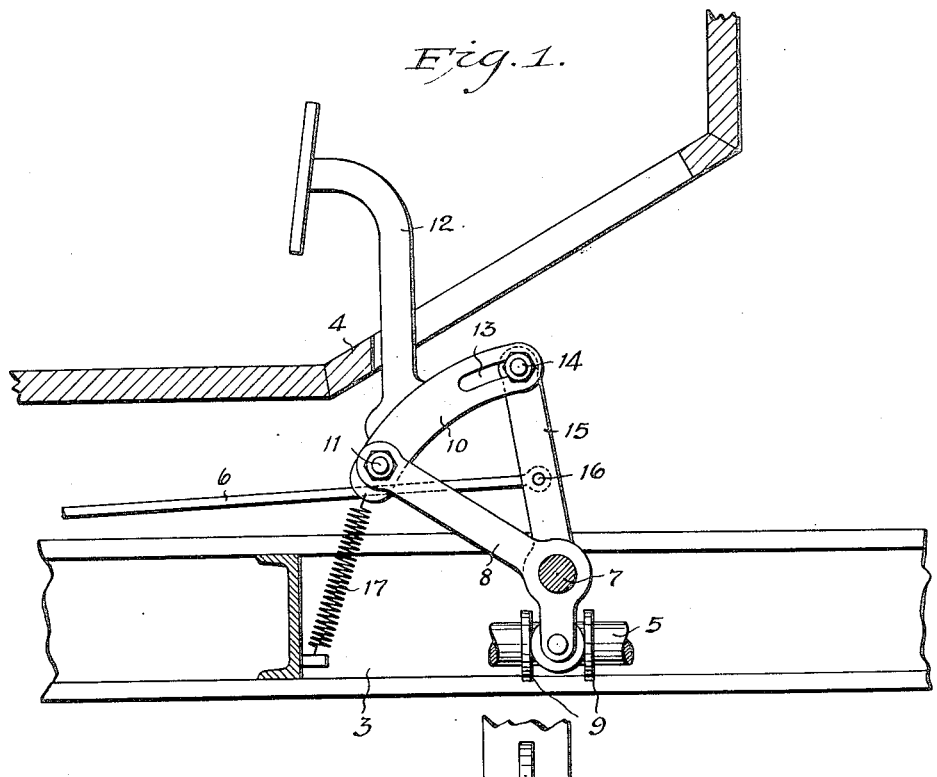
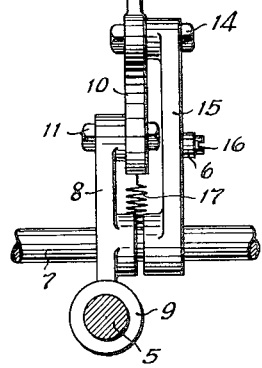

1,513,905

UNITED STATES PATENT OFFICE.

ALDEN J. HIERN, OF LINTON, INDIANA.

CLUTCH AND BRAKE OPERATING MECHANISM.

Application filed March 16, 1923. Serial No. 625,555.

*To all whom it may concern:*

Be it known that I, ALDEN J. HIERN, a citizen of the United States, and a resident of Linton, in the county of Greene and State of Indiana, have invented a new and Improved Clutch and Brake Operating Mechanism, of which the following is a full, clear, and exact description.

This invention relates to improvements in motor vehicles and has particular reference to a combined clutch and brake operating mechanism.

An object of the invention is to provide an improved mechanism for controlling the operation of the clutch and brakes of a motor vehicle in such manner that the clutch parts and the brakes may be successively operated by the actuation of a single element.

Another object is to successively operate the clutch parts and brakes by the movement of a single element in one direction only.

The above and other objects will appear more clearly from the following detail description, when taken in connection with the accompanying drawing, which illustrates a preferred embodiment of the inventive idea.

In the drawing—

Figure 1 is a side elevation of the operating mechanism constructed in accordance with the invention; and Figure 2 is an end elevation thereof.

Referring more particularly to the accompanying drawing, the numeral 3 indicates the chassis of a motor vehicle and 4 the floor board thereof. 5 indicates the clutch operating element and 6 the brake rod which extends rearwardly of the vehicle and is connected in the usual manner to the brake drum.

The operating mechanism which embodies the essential features of the present invention is so designed as to be applicable to motor vehicles of known construction and includes a stub shaft 7 supported in any desired manner on the chassis 3. Rockingly mounted on this shaft 7 is a bell crank lever 8, the lower end of which is disposed between the flanges 9 formed upon the member 5 so that a movement of the lever 8 about the shaft 7 as a pivot will impart a movement to the member 5 to actuate the clutch parts. The end of the lever 8 opposite that engaged with the member 5 is connected to one end of an arcuate bar 10 by means of a bolt or other suitable fastening device 11, so that movements of the bar 10 will be imparted to said lever. Intermediate the ends of the bar 10 the same has projecting upwardly therefrom the foot pedal 12 which extends through the usual opening formed in the floor board 4 and which is positioned so that the operator of the vehicle may have ready access thereto.

The end of the bar 10 opposite that to which the lever 8 is connected is provided with a longitudinally extending arcuate slot 13 which receives therein a pin or bolt 14 projecting laterally from the upper end of a brake operating lever 15, the lower end of which is pivotally mounted on the shaft 7. The forward end of the brake rod 6 is pivotally connected at 16 to the lever 15 intermediate its ends. As clearly shown in Figure 2, the levers 8 and 15 are preferably disposed on opposite sides of the bar 10. Normally, the pin 14 is engaged with the bar 10 at the outer extremity of the slot 13 therein and in this position the clutch parts are engaged and the brakes are in their normal or inoperative positions. To yieldingly maintain the operating mechanism in the normal position shown in Figure 1, a retractile spring 17 is provided, one end of which is connected to the chassis, while the opposite end thereof is secured to an adjacent end of the bar 10.

In practice, when it is desired to disengage the clutch parts the operator presses forwardly on the pedal 12 and this forward movement is imparted to the bar 10 and upper end of the lever 8 with the result that said lever is moved about the shaft 7 as a pivot to throw the member 5 rearwardly, thus disengaging the clutch parts. By reason of the slot 13 of the bar 10 this initial movement of said bar and lever 8 will be relative to, or independent of the lever 15 until the inner end of the slot 13 is engaged by the pin or bolt 14, at which time the clutch parts will be entirely disengaged. Now should it be desired to operate the brakes, a further pressure upon the pedal 12 will cause the entire mechanism including the levers 8 and 15 and the bar 10 to move in unison and this movement of the lever 15 will exert a forward pull upon the brake rod 6 to actuate the brakes connected therewith. It will be obvious from the foregoing description that when the pedal 12 is released by the operator the spring 17 will operate to restore the mechanism toward its normal position and in this reverse movement the brakes are first released, following which the member 5 is actuated to again engage the clutch parts.

From the foregoing description, it will be apparent that the present invention provides, in contradistinction to the usual clutch and operating means wherein separate elements are employed for actuating the clutch and brake parts, a mechanism wherein a single element is utilized to operate both the clutch and brake parts by a movement of said element in one direction only.

What is claimed is:

1. In a motor vehicle, the combination with clutch and brake actuating connections; of a lever connected to each of said connections, a common pivot for said levers, a bar to which one of said levers is connected and which is provided with a slot for receiving an end of the other lever to permit of a relative movement between said levers, and means for operating said bar to initially move said levers relative to each other and thereafter move the same in unison.

2. In a motor vehicle, the combination with clutch and brake actuating connections; of an operating element connected to each of said connections, a common mounting for said operating elements, and a bar to which said operating elements are connected and which has an initial movement relative to one of said elements when actuating the other, and a subsequent movement during which the first named operating element is actuated.

3. In a motor vehicle, the combination with clutch and brake actuating connections; of an operating element connected to each of said connections, a common mounting for said operating elements, said elements having relative movements with respect to each other, a single element for successively actuating said operating elements from their normal positions to operate said clutch and brake connections, and means connected to said single element for restoring said operating elements to their normal positions after being actuated.

4. A control device for clutch and brake actuating connections including a pivot, levers mounted upon said pivot and extending radially therefrom at an angle to each other and each connected to one of said connections, a bar having one end secured to an end of one of said levers, means joining an end of the other lever with the opposite end of said bar to permit of initial relative movement of the bar and the first-named lever with respect to said other lever and a subsequent unitary movement of said levers, and means carried by said bar for effecting the operation of said levers.

ALDEN J. HIERN.